United States Patent [19]

No et al.

[11] Patent Number: 4,815,781

[45] Date of Patent: Mar. 28, 1989

[54] INDUSTRIAL ROBOT HAND

[75] Inventors: Shinichiro No, Tokyo; Minao Kimura, Saitama, both of Japan

[73] Assignee: Kabushiki Kaisha Yakult Honsha, Tokyo, Japan

[21] Appl. No.: 95,790

[22] Filed: Sep. 14, 1987

[30] Foreign Application Priority Data

Sep. 16, 1986 [JP] Japan .......................... 61-140589[U]

[51] Int. Cl.$^4$ .......................... B25J 15/08; B25J 15/00
[52] U.S. Cl. ...................................... 294/88; 294/86.4; 294/106; 294/907; 414/751
[58] Field of Search ............ 294/88, 106, 86.4, 119.1, 294/103.1, 907; 414/751, 753; 901/31, 37, 49, 46

[56] References Cited

U.S. PATENT DOCUMENTS

| | | | |
|---|---|---|---|
| 4,586,869 | 5/1986 | Nihei | 294/86.4 |
| 4,592,691 | 6/1986 | Lebouc et al. | |
| 4,597,714 | 7/1986 | Morrison et al. | |
| 4,609,325 | 9/1986 | Gabrielli | 414/751 |
| 4,611,843 | 9/1986 | Burger et al. | 296/86.4 |
| 4,645,407 | 2/1987 | Williams | |

FOREIGN PATENT DOCUMENTS 3133201 5/1982 Fed. Rep. of Germany .

OTHER PUBLICATIONS

IBM Technical Disclosure Bulletin, vol. 28, No. 7, Dec. 1985, "Robot Gripper for Polystyrene Tray Removal".

*Primary Examiner*—James B. Marbert
*Attorney, Agent, or Firm*—Beveridge, DeGrandi & Weilacher

[57] ABSTRACT

An industrial robot hand for material handling. A fixed frame is connected to an arm of an industrial robot. A movable frame having a rectangular plan shape is horizontally movably supported on the fixed frame. Two guide rods are vertically attached to each of the four sides of the movable frame. A tapered guide extends downwardly from each of the guide rods. Sandwiching plates are provided on two opposite sides of the movable frame. Each sandwiching plate is pivotally attached to the movable frame by a horizontal axis at the central portion of the sandwiching plate. Engaging members project inwardly from the lower inner surface of the sandwiching plates to hold the material to be handled. Rollers and roller guides restrict the movement of the movable frame on the fixed frame. A driving mechanism pivots the sandwiching plates to bring the engaging members into engagement with the material.

3 Claims, 5 Drawing Sheets

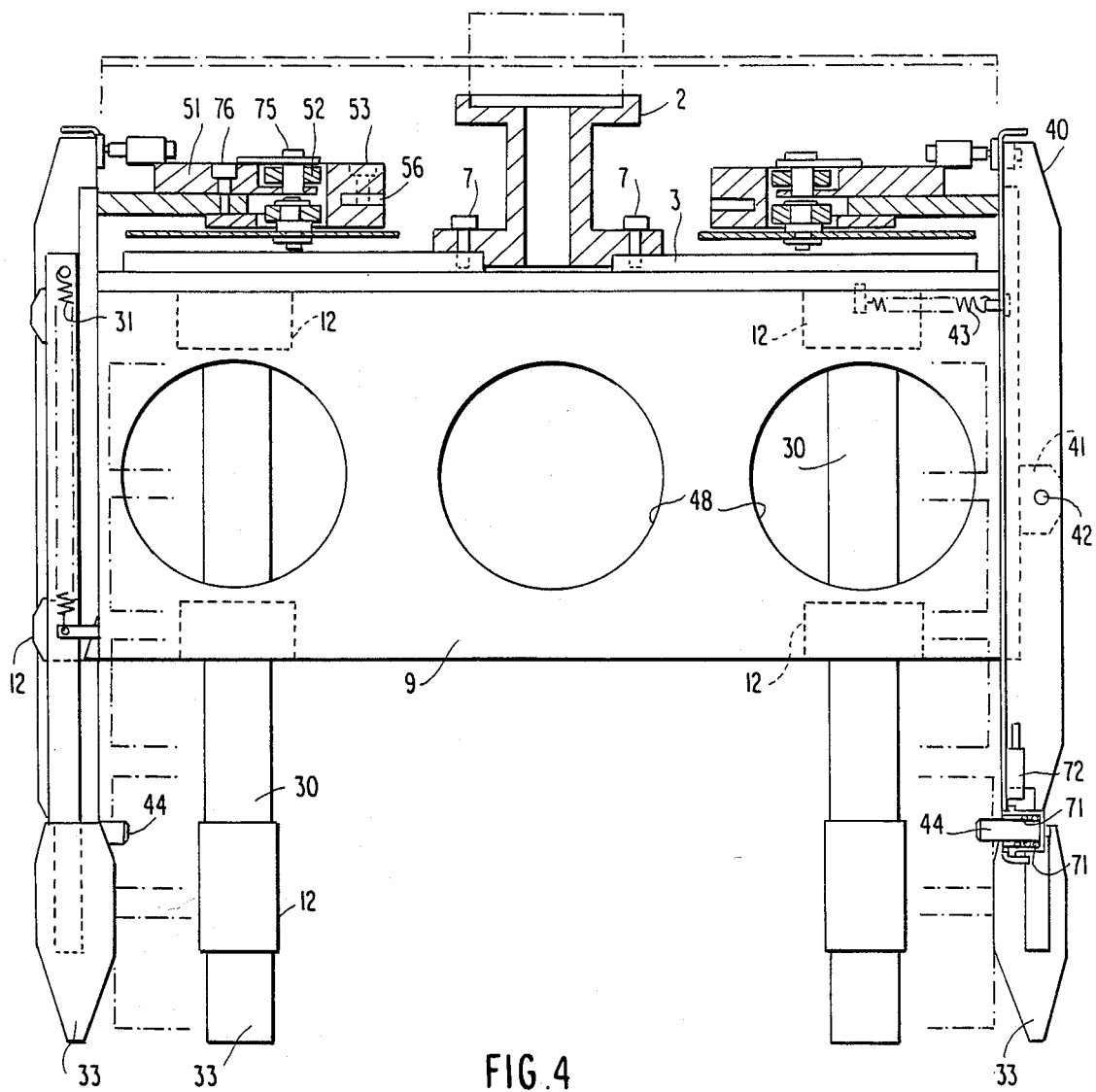
FIG.4
FIG.5
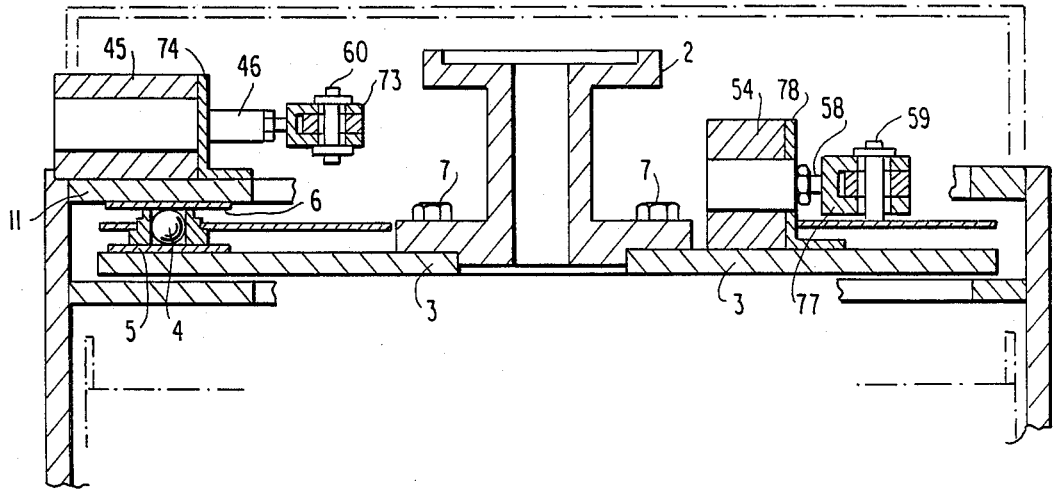

INDUSTRIAL ROBOT HAND

BACKGROUND OF THE INVENTION

The present invention relates to an industrial robot hand. More particularly, the present invention relates to a mechanical hand which can be connected to an industrial robot, for example to the end wrist portion of the arm of an industrial robot, to handle material.

Various kinds of material handling apparatus, such as robots, manipulators, fork lift trucks, cranes, and the like, have been put into practical use. Such apparatus frequently includes a mechanical hand for grasping material. These hands can mainly be classified into mechanical hands of the finger type, having claw-like engaging members to hold material, and mechanical hands of the fingerless type, having no engaging member.

Finger type mechanical hands can be classified into hands which hang down, hands which pinch, hands which sandwich, and hands which grasp, among others. In particular, in the case of sandwiching type mechanical hands, the engaging members are inserted from both sides of the material to be grasped, into or under the bottom portion thereof or into the lateral holes formed in the material, thereby permitting lifting up or moving the material. It is necessary to accurately locate the mechanical hand to a proper grasping position, e.g. just above the material. If the hand is not accurately positioned, the engaging members will not be properly located on both sides of the material, and so the material cannot be properly grasped.

It is possible to accurately position the mechanical hand of an industrial robot. However, there is a possibility that the position of the material to be grasped has deviated from the expected position. It is difficult always to accurately set the material at a constant position. Thus, an improved technique is needed to position the hand of an industrial robot accurately with respect to the material. In the work of stacking material, when an industrial robot piles up materials at a fixed coordinate position, it may be unclear whether the material has in fact been stacked at the position designated by the robot hand as the coordinate position. In practice, in many cases the position of the material slightly deviates from the coordinate position. Particularly, when the material has engaging portions, it cannot be properly stacked if the positions of different pieces of material in the stack deviate from the coordinate position.

On the other hand, when material is packaged within soft packaging, or when the dimensional accuracies of the containers in which the material is enclosed are low, or when pallet on which material is mounted is deformed, or the like, stacked materials may not be aligned properly in the vertical direction. Therefore, the engaging members of the mechanical hand cannot be lowered properly because the engaging members touch the material the position of which deviates relative to the position of other material.

As a solution for such a problem, it is possible to utilize apparatus providing a video input that is recognized or to utilize a method or an apparatus including a sensor, whereby the position is corrected and controlled by the sensor output. However, these methods have the drawback of an increase in cost.

SUMMARY OF THE INVENTION

Therefore, one aspect of the present invention is an inexpensive, compact, and light-weight industrial robot hand in which, even if the position of stacked material deviates from a coordinate position due to various causes, the mechanical hand of the industrial robot, i.e., the engaging members, can properly grasp the material.

In a preferred embodiment, an industrial robot hand according to the present invention includes a fixed frame for connection to the end wrist portion of the arm of an industrial robot and a movable frame which has a rectangular plan shape and which is supported from the fixed frame so as to be movable in the horizontal direction. Guide rods are vertically mounted on four sides of the movable frame. A downwardly extending, tapered guide is fixed to the tip of each guide rod. Sandwiching plates attached to two opposite sides of the movable frame are pivotally swingable at their central sections about a horizontal axis. Engaging members, for holding the material to be handled, project inwardly from the insides of the lower portions of the sandwiching plates. Rollers and roller guides are provided for restricting the movement of the movable frame on the fixed frame. A driving mechanism, for moving the sandwiching plates to engage the material, is attached to the movable frame.

When it is desired to use a mechanical hand constituted as described above, the fixed frame is first connected to a material handling apparatus, e.g., to the arm of a robot. By operating the robot, the mechanical hand can be moved to a position almost above the material and can be lowered until the engaging members of the sandwiching plates are located below the material. At this time, since the driving mechanism has not been operated, the sandwiching plates are not grasping the material. Further, the locking mechanism, consisting of the rollers and roller guides, is also inoperative. In this manner, the movable frame is set to be movable in the horizontal direction.

When the mechanical hand is lowered in such a state, if the material has been stacked and aligned, no problem occurs. If the positions of the separate pieces of material in the stack slightly deviate, and the tapered guides touch the material, the movable frame is moved to vertically align the movable frame with the material. Thus, so long as the material is positioned within a limited range, the mechanical hand can be lowered to grasp the material.

After the engaging members of the mechanical hand have reached the bottom of the stack of material, or the holes for inserting the engaging members, the driving mechanism is operated to pivot the sandwiching plates. Due to this, the engaging members come into engagement with the material, and so the material is grasped by the mechanical hand. After the material has been grasped, the robot arm is operated to lift up the material. Even if the material lifted up comes into contact with adjacent material or the like during this lifting operation, the movable frame can be moved. Therefore, dropping of the material, breakdown of the arm of the material handling machine, or the like due to a shock, is prevented. After the danger of contact has been eliminated, the locking mechanism is operated to lock the movable frame to the fixed frame, and the material is processed in accordance with the desired procedure. In the case where material having engaging portions is stacked, the mechanical hand having material to be added to the stack is moved to a position just above the already stacked material and is lowered while correcting the position so as to accurately align and stack the material. After the desired material handling has been completed, the material is released from the mechanical hand by the opposite procedure. The next material handling task can then be executed in a similar manner.

As described above, according to the invention, even if the positions of the stacked material deviate in the vertical direction, or even if the mechanical hand is not accurately placed at the position just above the material, when the material is within the range of the tapered portion of the guides, the material can be grasped by the mechanical hand. Therefore, high accuracy of the position in the horizontal direction is not required for materials which are stacked by means of engaging portions. The mechanical hand can cope with such materials. Moreover, the mechanical hand of the invention has a simple structure such that the movable frame is movably attached to the fixed frame, and a tapered guide is merely attached to the movable frame. Therefore, the apparatus is compact-sized, light weight, and inexpensive. Also, maintenance can be easily performed. The mechanical hand of the invention has a large practical benefit. When the sandwiching plates grasp the material, the material can be held by the engaging members with certainty. Dropping of the material during the handling work is thus prevented. Additionally, when the locking mechanism is operated, the hand can also be used as an ordinary grasping hand.

In embodying the present invention, it is desirable to reduce the moving resistance of the movable frame by interposing ball bearings between the fixed frame and the movable frame. The moving resistance can also be reduced by having a thin oil layer or thin air layer between the fixed frame and the movable frame. Since there is a possibility that the guide rods may collide with the material during the material handling, it is desirable to have a structure such that, for example, when the guide rods collide with the material, the guide rods move backward and a microswitch or the like is provided to detect the backward movement, thereby activating an alarm or stopping the movement of the arm. On the other hand, it is preferable that the locking mechanism, diving mechanism, or the like be in the form of a piston cylinder unit. It is recommended that the mechanical hand be provided with a mechanism to limit the movable range of the frame even when the locking mechanism is released. It is preferable that the movement range of the frame be smaller than the movement range of the tapered portion. It is desirable to provide two or more guide rods for one surface near the edge portion of the movable frame. If the interval between the guides is slightly larger than the corresponding width of the material and is also smaller than the inner width of the frame, the material will not interfere with the frame. Such a structure is preferable since the cost is relatively low and maintenance can be easily performed.

BRIEF DESCRIPTION OF THE DRAWINGS

The above and other aspects and features of the present invention will become more apparent from the following detailed description and the appended claims, with reference to the accompanying drawings in which like parts bear like reference numerals. In the drawings:

FIG. 4 is a cross sectional view taken along line IV—IV in FIG. 7;

FIG. 5 is a cross sectional view taken along line V—V in FIG. 7.

DETAILED DESCRIPTION OF THE INVENTION

An outline of an embodiment of the present invention will be described hereinbelow with reference to FIGS. 1 to 3.

Figure 1A:
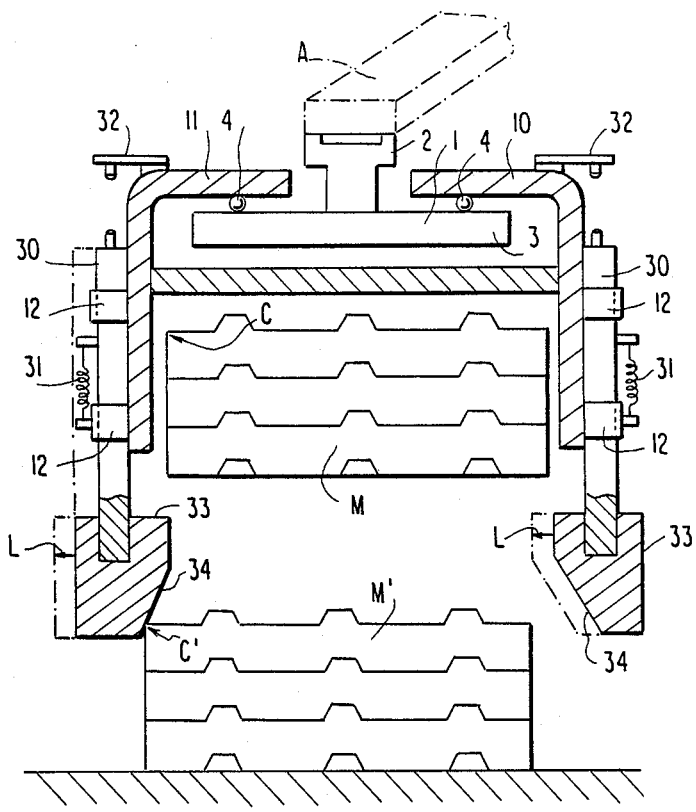
FIGS. 1A and 1B are cross sectional views showing the relation between a fixed frame and a movable frame in a mechanical hand in accordance with one embodiment of the present invention.
Figure 1B:
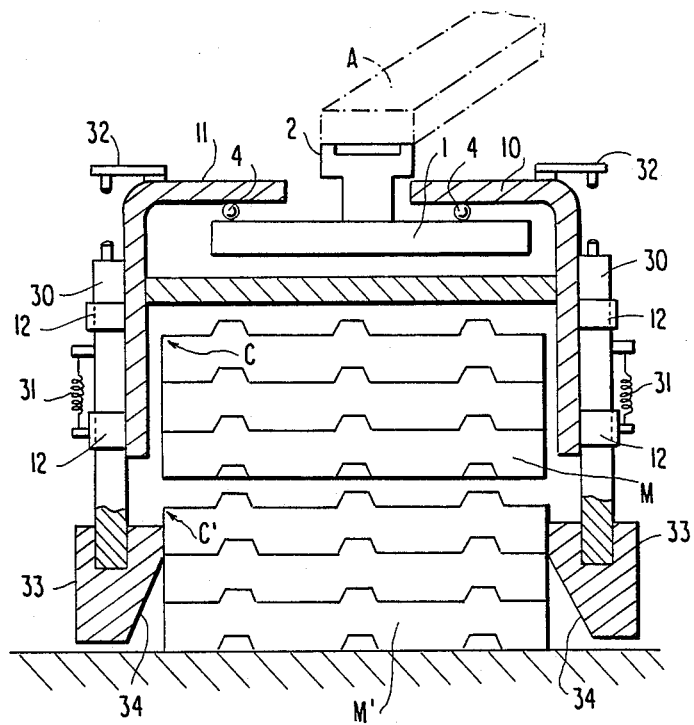

In FIGS. 1A and 1B, a material grasping hand according to an embodiment of the invention includes a fixed frame 1 and a movable frame 10. The fixed frame 1 is fixed to an arm A of a material handling machine through a flange 2. Ball bearings 4 are interposed between a plate 3 of fixed frame 1 and a movable plate 11 of movable frame 10. Movable frame 10 is movable on fixed frame 1 in an arbitrary horizontal direction within a limited region as will be explained hereinafter.

Figure 2:
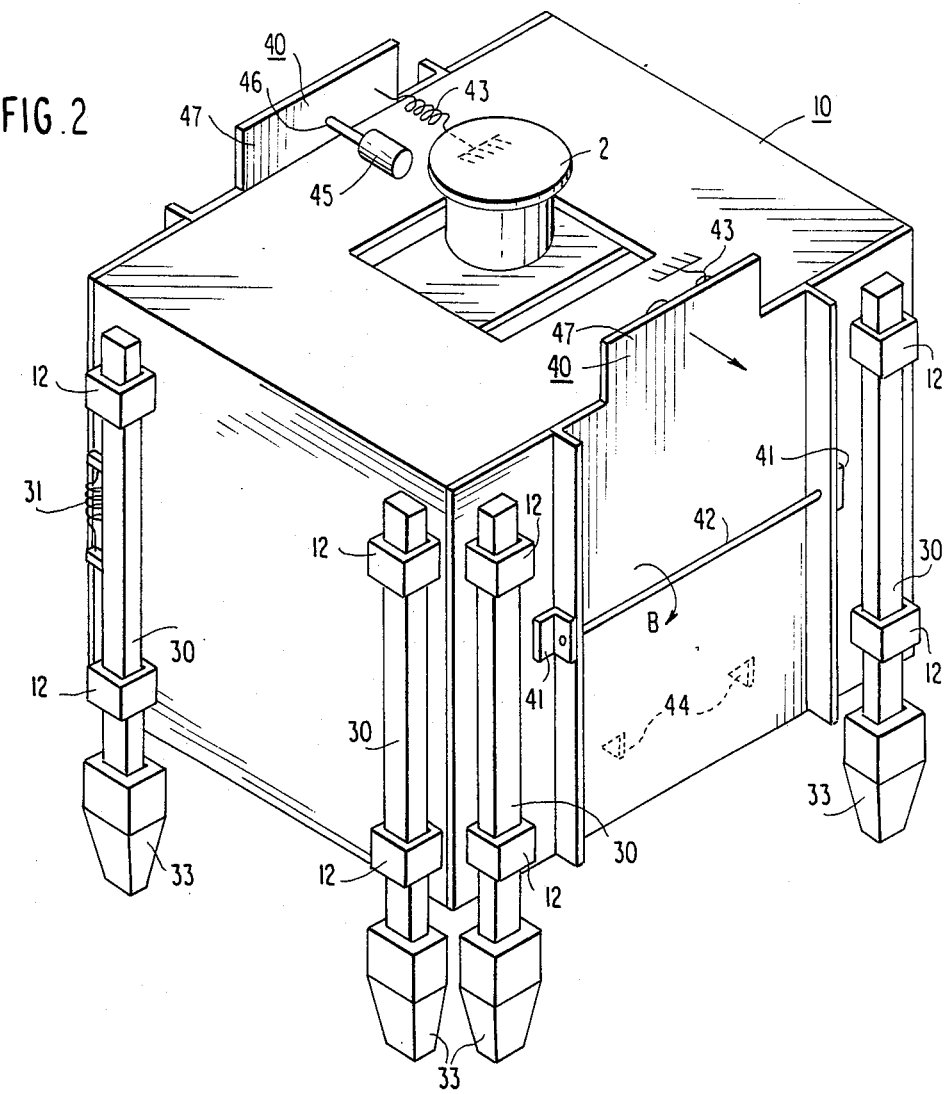
FIG. 2 is a perspective view showing a mechanical hand in accordance with an embodiment of the present invention.

As shown in FIG. 2, movable frame 10 has a rectangular plan shape. Two guide rods 30 are vertically slidably attached to each of the four sides of movable frame 10. Thus, as shown in FIGS. 1A and 1B, each guide rod 30 is vertically slidably attached in two metal fittings 12 and is urged downwardly by a coil spring 31. When one of the guide rods 30 unexpectedly comes into contact with material or the like, the rod moves upwardly and touches a limit switch 32 at a predetermined limit position, i.e. a limit position at which the material to be grasped is not broken, so that an alarm is generated or the movement of the arm is stopped.

A guide 33 is fixed to the lower end of each guide rod 30. As shown in FIGS. 1A and 1B, the lower portion of the inner surface of each guide rod 33 is outwardly tapered with a tapered portion 34 toward the side of the material to be grasped. Because of this outward taper, the space adapted to guide the material, i.e. the interval between the opposite guides 33, widens downwardly. Therefore, as shown in FIGS. 1A and 1B, when the tapered portion 34 of a guide 33 comes into contact with corner portion C' of the material M', movable frame 10 moves in the direction indicated by arrow L.

As shown in FIG. 2, sandwiching plates 40 are provided for two opposite sides of the movable frame 10. Each sandwiching plate 40 is pivotally swingably supported by an associated L-shaped metal fitting 41 and a horizontal axis 42 at substantially the vertically central position of the plate 40. The upper portion of plate 40 is urged inwardly by a coil spring 43. Two claw-like engaging members 44 project from the inner surface of the lower portion of each plate 40. The claws 44 can be used to grasp the material. For this purpose, the sandwiching plates 40 can be rotated in the direction indicated by arrow B in FIG. 2 agains the urging of coil springs 43. To rotate the plates 40, driving mechanisms such as piston cylinder units 45, are mounted on the movable plate of the movable frame 10. Therefore, when piston rod 46 presses projecting portion 47 of a sandwiching plate 40, the plate 40 is pivoted and the claws 44 come into engagement with the material.

Figure 3:
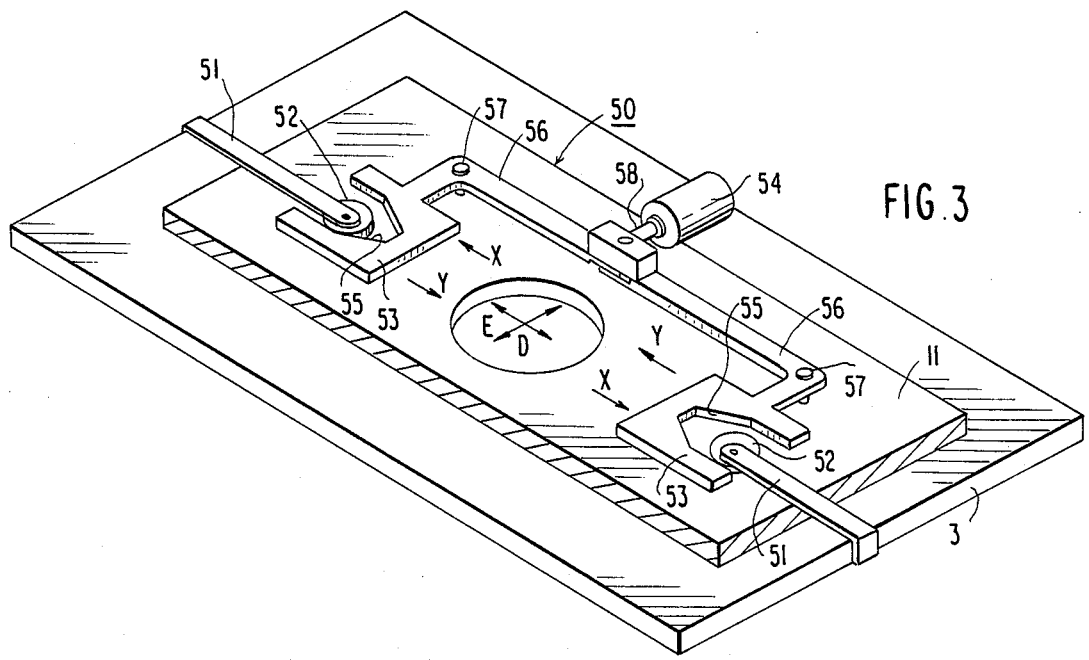
FIG. 3 is a perspective view showing a locking mechanism for incorporation into a mechanical hand in accordance with the present invention.

As shown in FIG. 3, a locking mechanism 50 is provided for the fixed frame 1 and movable frame 10. Locking mechanism 50 includes rollers 52 which are attached to the upper plate 3 of the fixed frame 1 through arms 51. Mechanism 50 further includes roller guides 53 which are mounted on the movable plate 11 that is a part of the movable frame 10. Additionally, locking mechanism 50 includes a piston cylinder unit 54. The rollers 52 and roller guides 53 also function as a limiting mechanism for limiting the region of movement of movable frame 10 on fixed frame 1.

Each arm 51 is bent in substantially an L shape. One end of each arm 51 is fixed to the upper plate 3, and a roller 52 is rotatably axially supported on the other end. The portion of the roller guide 53 on the side which faces the arm 51 is notched, and the deep portion of the notch is narrow and is cut out so as to form a trapezoidal portion 55. Therefore, when the roller guides 53 move in the X direction, the rollers 52 are inserted into the trapezoidal portions 55, making the rollers 52 and the roller guides 53 integral. Consequently, the rollers 52 and roller guides 53 cannot move relative to each other. Accordingly, movable frame 10 is locked to fixed frame 1. Since the notches of the trapezoidal portions 55 are formed in the roller guides 53, when the rollers come into engagement with the notches, the movable plate 11 is locked in both the D and the E directions of FIG. 3. When the roller guides 53 are moved in the Y direction, the movable plate 11 is unlocked.

To move the roller guides 53 in the X and Y directions, L-shaped arms 56 extend from the roller guides 53. Arms 56 are pivotally attached to movable plate 11 at the corners of the L by pins 57. The second end of each L-shaped arm 56 is driven by a piston rod 58 of a single piston cylinder unit 54.

The mechanical hand of this embodiment operates in the following manner. As depicted in FIG. 1A, the mechanical hand is to grasp material M and to stack that material on top of already stacked material M'. Roller guides 53 are moved in the Y direction, unlocking locking mechanism 50, and the mechanical hand is lowered. A corner portion C' of material M' comes into contact with the tapered portion 34 of one guide 33. Thus, movable frame 10 is moved in the L direction, and the mechanical hand can be further lowered. Therefore, movable frame 10 is positioned as shown in FIG. 1B, and the material M can be accurately stacked on the material M'.

After the mechanical hand has been lowered, two piston cylinder units 45, only one of which is shown in FIG. 2, are actuated to pivot the projecting portions 47 of sandwiching plates 40 outwardly. The lower portions of plates 40 are accordingly pivoted inwardly, and claws 44 hold the material M. In this manner, the material can be grasped for predetermined material handling. Locking mechanism 50 causes the mechanical hand to grasp the material, and the hand may be operated to move or stack the material as desired. After completion of the moving or stacking of the material, piston rods 46 of piston cylinder units 45 of the driving mechanism are retracted to disengage claws 44 from the material.

A preferred embodiment of the present invention will now be described with reference to FIGS. 4 to 7. In these diagrams, the same or similar parts and components as those shown in FIGS. 1 to 3 are designated by the same reference numerals, and their detailed description is omitted.

As shown in FIGS. 4 and 5, upper plate 3 of fixed frame 1 is attached by bolts 7 to flange 2 which is coupled with the arm of the material handling machine. Movable plate 11 is movably supported on upper plate 3 through the ball bearings 4, interposed at a plurality of positions on plate 3. To smoothly rotate the ball bearings, disks 5 and 6 are arranged respectively on the upper surface of upper plate 3 and on the lower surface of movable plate 11, below and above ball bearings 4.

Figure 6:
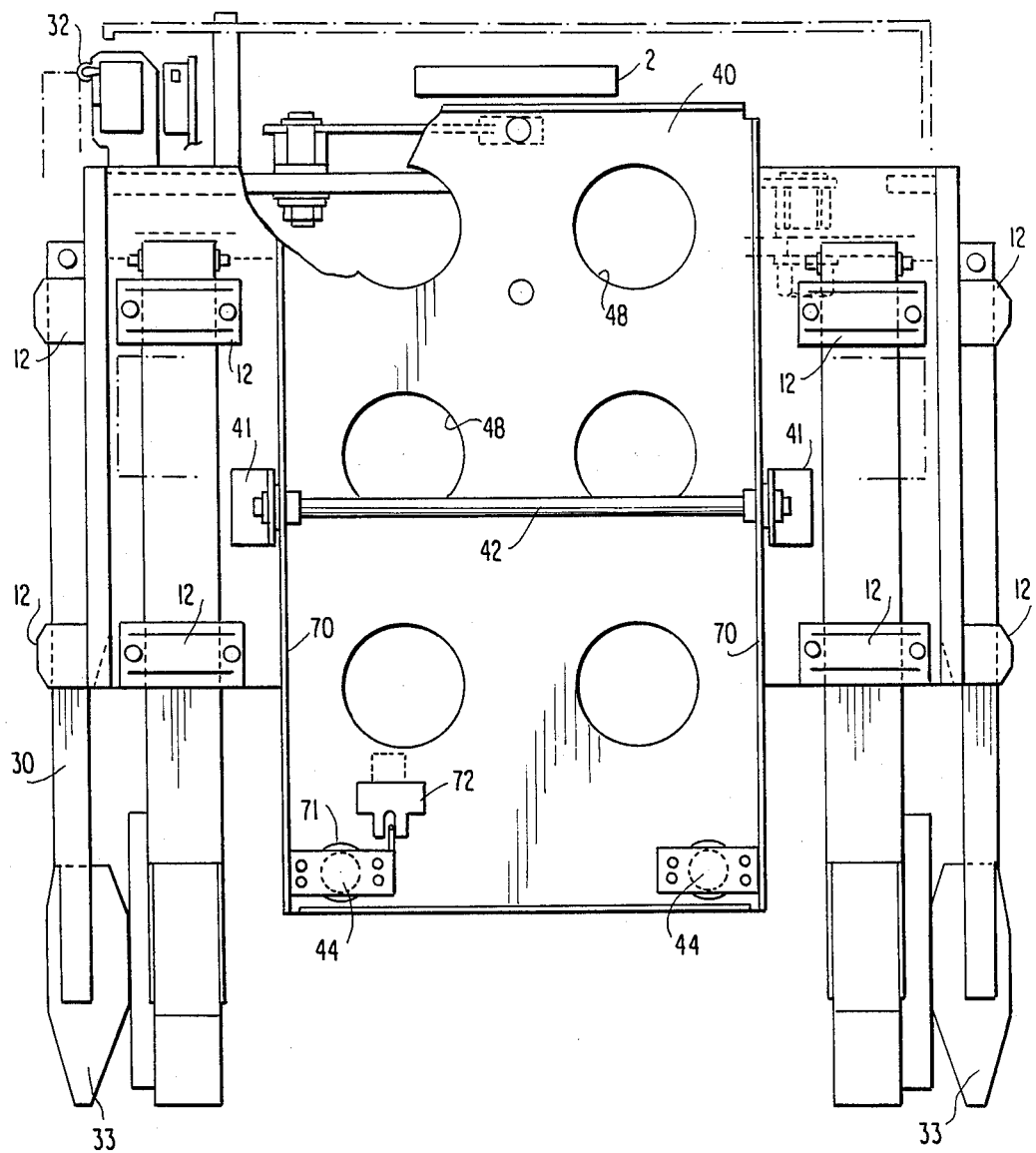
FIG. 6 is a front view of one embodiment of the present invention.
Figure 7:
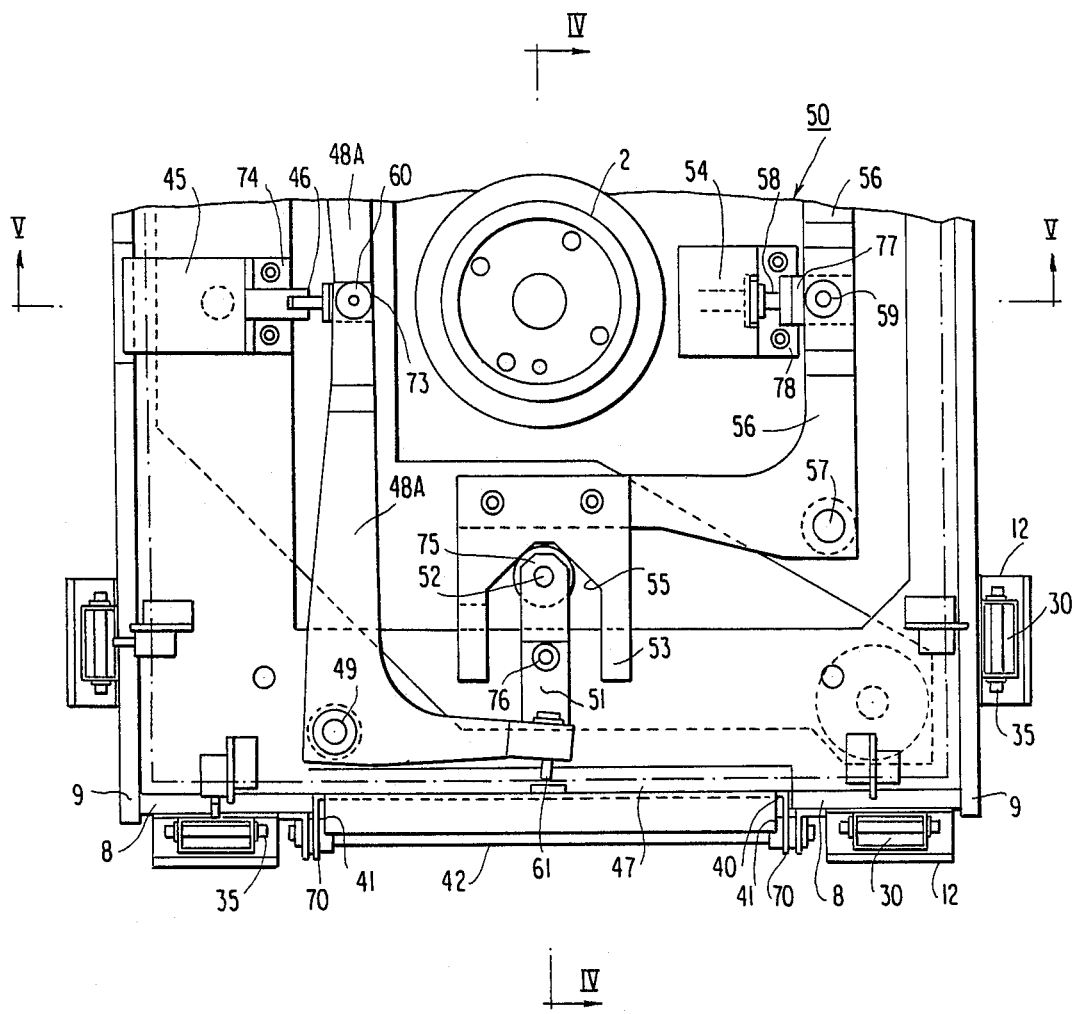
FIG. 7 is a plan view of one embodiment of the present invention but having a part omitted for clarity.

Movable frame 10 has a substantially rectangular plan shape. Two opposite sandwiching plates 40 and two opposite side plates 9 are positioned on the side of movable frame 10. A plurality of through holes 48 are formed in those plates, enabling the material within them to be seen. As shown in FIGS. 6 and 7, sandwiching plate 40 has two flange portions 41 which are axially supported by horizontal axis 42. Claws 44, which are depicted in FIG. 4, are formed on the inner surface of plate 40, can freely move forward or backward, and are ordinarily positioned by coil springs 71. The motion of claws 44 is monitored by limit switches 72.

In the embodiment shown in FIGS. 4 to 7, the driving mechanism is a single piston cylinder unit 45. As shown in FIG. 7, projecting portions 47 of sandwiching plates 40 can be pivoted by two L-shaped arms 48A, under control of piston cylinder unit 45. Thus, piston rod 46 of piston cylinder unit 45 is coupled by pin 60 of knuckle 73 to arms 48A. Piston cylinder unit 45 is fixed to movable plate 11 by a bracket 74. Similarly, the L-shaped arms 48A are pivotally attached to movable frame 10 by pins 49. Therefore, when the L-shaped arms 48A are pressed by piston rod 46, projections 61, extending laterally from the other end of each of the arms 48A, press the projecting portions 47 of the sandwiching plates 40. The upper portion of each plate 40 is pivoted outwardly, and the lower portion is pivoted inwardly, so that claws 44 hold the material.

Locking mechanism 50 has substantially the same structure as that described in FIG. 3. Piston rod 58 is coupled by pin 59 of knuckle 77 to arms 56. Piston cylinder unit 54 is fixed to upper plate 3 by a bracket 78. Arms 51, which via pins 75 support rollers 52, are fixed to movable frame 10.

Since the operation of this embodiment is substantially the same as that of the embodiment explained in FIGS. 1 to 3, its description is omitted.

As described above, according to the invention, the movable frame is horizontally movably attached to the fixed frame which is connected to the arm of an industrial robot. The tapered guides are attached to the movable frame. Therefore, even if the materials to be grasped are misaligned in the horizontal direction, due to an inclination of the stacked materials or the like, or even if the mechanical hand is not accurately positioned above the materials, the material handling work can be performed. Further, since the tapered guides are attached to the movable frame, the structure is simple. Therefore, the robot hand is compact-sized, lightweight, and inexpensive, and maintenance can be easily performed. Further, by actuating the locking mechanism, the robot hand can be used in a manner similar to a conventional hand.

The present invention is not limited to the foregoing embodiments, but many modifications and variations are possible within the spirit and scope of the invention. For example, the engaging members are shown as the claws 44; however, engaging members having other shapes can be utilized.

What is claimed:

1. An industrial robot hand comprising:
    a fixed frame adapted to be connected to an industrial robot arm;
    a movable frame supported on said fixed frame while permitting horizontal movement of said movable frame on said fixed frame;
    means connected to said fixed frame and said movable frame for resricting the movement of the movable frame on the fixed frame;
    a plurality of downwardly extending tapered guides, at least one guide vertically attached to each side of said movable frame;
    two sandwiching plates positioned respectively on two opposite sides of said movable frame;
    means horizontally pivotally attaching each sandwiching plate to said movable frame at substantially the central portion of each said sandwiching plate;
    at least one engaging member projecting inwardly from the lower inner surface of each of said sandwiching plates for engaging material to be handled; and
    a driving mechanism for pivoting said sandwiching plates to cause said engaging members to engage material to be handled.

2. An industrial robot hand according to claim 1 wherein said movement restricting means comprises a pair of rollers attached to said fixed frame, a pair of L-shaped arms, a pair of roller guides, one roller guide integrally connected to one end of each L-shaped arm; a piston cylinder unit having a piston rod connected to the other end of each of said arms; means pivotally attaching each of said L-shaped arms to said movable frame; each roller guide including a trapezoidal portion so that upon actuation of said piston cylinder unit, the piston rod moves to pivot said L-shaped arms relative to said movable frame and the roller guides are moved to cause said trapezoidal portions to engage said rollers to restrict the movement of the movable frame on the fixed frame, and when the piston cylinder unit is deactuated, said roller guides disengage from said rollers to release the movable frame for movement on said fixed frame.

3. An industrial robot hand according to claim 1, wherein said driving mechanism comprises a piston cylinder unit attached to said fixed frame and having a piston rod connected to said sandwiching plates so that upon actuation of said cylinder unit, said piston rod moves to pivot the upper portions of said sandwiching plates outwardly and the lower portions thereof inwardly about said horizontally pivotally attaching means to cause said engaging members to engage material to be handled and hold that material.

* * * * *